Aug. 26, 1930.  M. H. ACKERMAN  1,774,219
WRIST PIN BEARING
Filed May 2, 1928  2 Sheets-Sheet 1

M. H. Ackerman
Inventor
By C. A. Snow & Co.
Attorneys.

Aug. 26, 1930.    M. H. ACKERMAN    1,774,219
WRIST PIN BEARING
Filed May 2, 1928    2 Sheets-Sheet 2

M. H. Ackerman
Inventor

By C. A. Snow & Co.
Attorneys

Patented Aug. 26, 1930

1,774,219

UNITED STATES PATENT OFFICE

MICHAEL H. ACKERMAN, OF MANSFIELD, OHIO, ASSIGNOR OF ONE-HALF TO LEWIS C. SICKEL, OF CALEDONIA, OHIO

WRIST-PIN BEARING

Application filed May 2, 1928. Serial No. 274,587.

This invention relates to wrist pin bearings of that type employed for connecting pistons of compressors and internal combustion engines to the piston or connecting rods.

Heretofore in structures wherein the pistons are subjected to high resistances, the pins and bushings used for connecting the pistons to the rods soon become worn, broken, or distorted because all of the working pressure and reciprocating strains are transmitted thereto through the piston.

It is an object of the present invention to provide, in addition to the usual pin, a novel form of bearing for carrying the thrust and reciprocating load to the crank so that the pin is relieved of all strain and serves solely as a connecting means.

Another object is to provide a structure of this character with ample bearing surfaces which can be properly lubricated while in operation.

A further object is to provide a durable structure of this character, with the reciprocating and working stresses distributed over large wearing surfaces, and in which wear can be compensated for by the use of flat shims instead of replacing worn pins and bushings with new parts.

With the foregoing and other objects in view which will appear as the description proceeds the invention resides in the combination and arrangement of parts and in the details of construction herinafter described and claimed it being understood that changes in the precise embodiment of the invention herein disclosed may be made within the scope of what is claimed without departing from the spirit of the invention.

In the accompanying drawings the preferred forms of the invention have been shown.

In said drawings.

Figure 1:
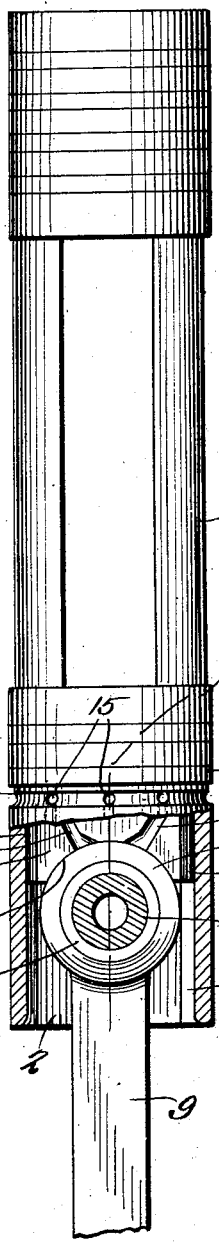
Figure 1 is a section through a bearing such as constitutes the present invention, said bearing being shown combined with the piston of the compressor of a refrigerating apparatus, a portion of the piston being shown in elevation.
Figure 2:
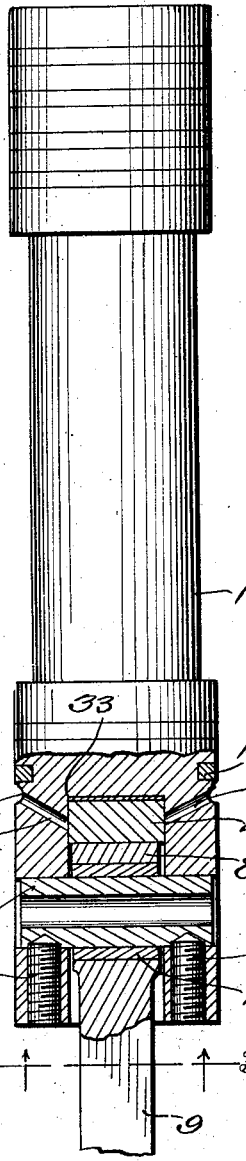
Figure 2 is a section through the bearing taken on the line 2—2, Figure 1, the piston being partly in elevation.
Figure 3:
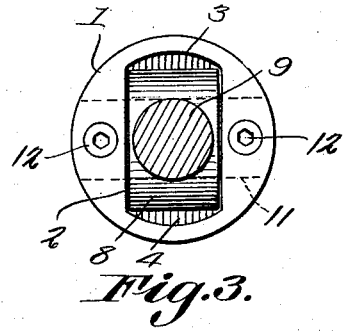
Figure 3 is a section on line 3—3, Figure 2.
Figure 4:
Figure 4 is a side elevation of the shoe constituting a thrust bearing for the connecting rod.
Figure 5:
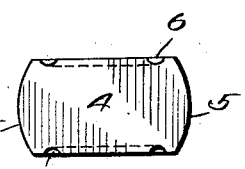
Figure 5 is a plan view of the shoe.
Figure 6:
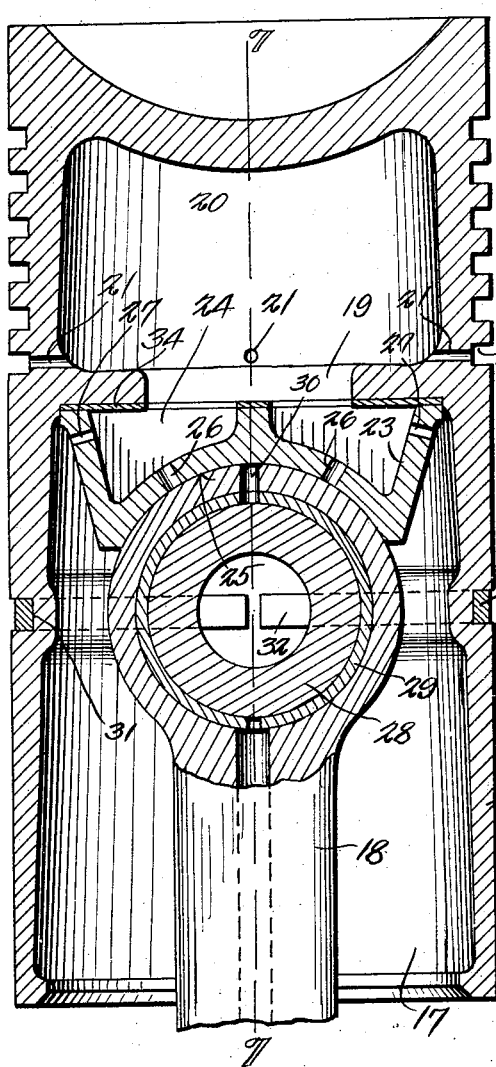
Figure 6 is a transverse section through a modified form of bearing for the connecting rod of an internal combustion engine.
Figure 7:
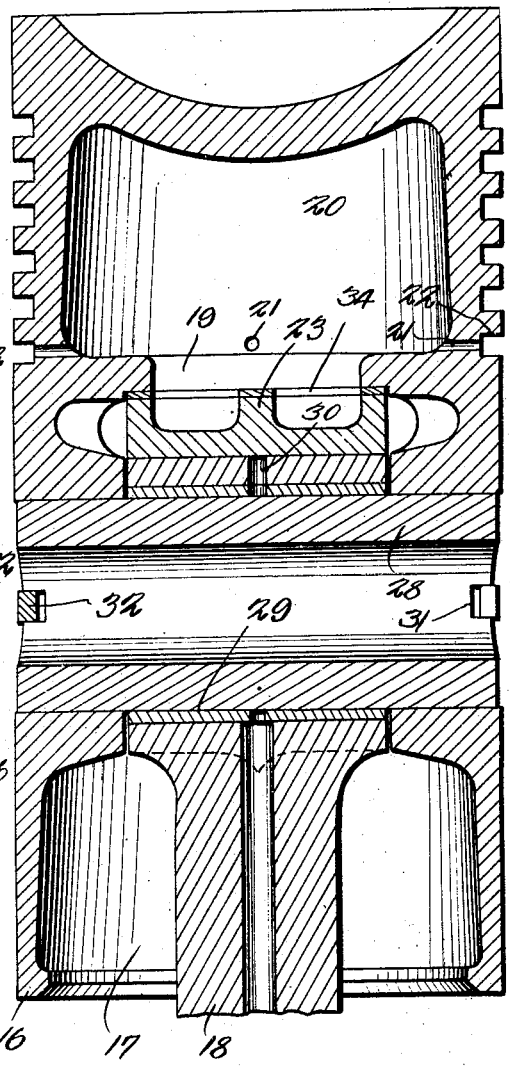
Figure 7 is a section on line 7—7, Figure 6.
Figure 8:
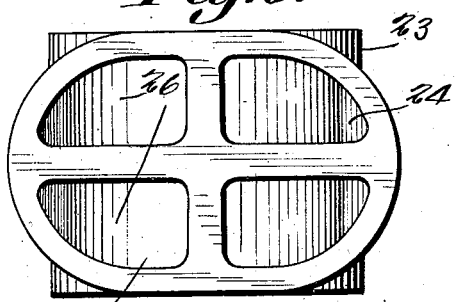
Figure 8 is a top plan view of the bearing cap or shoe.
Figure 9:
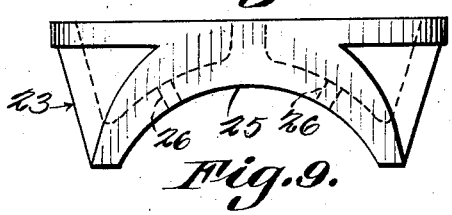
Figure 9 is a side elevation thereof.

Referring to the figures by characters of reference 1 designates the piston of a compressor such as used, for example, in refrigerating apparatus, this piston being provided, in one end, with a recess 2 the ends of which are preferably rounded as shown at 3. This recess is adapted to receive a bearing shoe 4 having rounded ends 5 and this shoe is adapted to be seated against the inner wall of the recess and to take the piston thrust. The shoe 4 has flat sides in which may be formed grooves 6. One face of the shoe 4 is concave, as shown at 7 and the grooves 6 open through this face. This concave face constitutes a bearing surface for the rounded end 8 of a connecting rod 9. A bushing 10 is provided within the end portion of the connecting rod and extending through this bushing is a wrist pin 11 held in place preferably by means of set screws 12 which are inserted into one end of the piston and project into the end portions of the pin as shown particularly in Figure 2.

An annular groove 13 is formed in the piston adjacent the oil scraper ring 14 carried by said piston so that, during the movement of the piston in one direction, oil will be accumulated by the ring 14 and directed into the groove 13. From this groove are extended bores 15 which are utilized for conducting lubricant to opposed faces of the shoe 4.

It is to be understood that the bearing faces of the shoe 4 and of the connecting rod are concentric with the center of the pin 11. As these bearing surfaces are in contact, it will be obvious that during the compression stroke of the piston the pin 11 will be relieved of excessive strain because the pressure will be transmitted between the piston and the connecting rod through the contacting surfaces of the shoe and the connecting rod.

In internal combustion engines such as Diesel engines, the structure illustrated in Figures 6 to 9 inclusive is preferably employed. Referring to these figures it will be noted that the piston 16 is provided, in one end, with a recess 17 for the reception of the connecting rod 18. The inner end of the recess 17 has an opening 19 in communication with a recess 20 in the head of the piston, this last named recess being provided for cooling and ventilation with oil ports 21 opening into an annular groove 22.

A shoe 23 is seated in the inner end of recess 17 and is divided into pockets 24 all of which communicate with the opening 19 and are adapted to receive lubricant therefrom. The bottom of the shoe is concaved as shown at 25 to provide a bearing surface and oil holes open through this bearing surface from the respective pockets 24 as shown at 26. Air vent openings 27 are provided in opposed end walls of the shoe.

The end of the connecting rod 18 is rounded so as to fit snugly against the bearing surface 25 of the shoe and these contacting surfaces of the shoe and connecting rod are concentric with the longitudinal center of a wrist pin 28 arranged diametrically within the piston. A bushing 29 extends around the pin within the end portion of the connecting rod and oil holes 30 are formed radially within the bushing and the end portion of the connecting rod. For the purpose of retaining the pin 28 in position, an annular groove 31 is formed in the piston, this groove being extended within the ends of the pin. Seated in this groove is a ring 32 which thus acts as an efficient lock for holding the pin against movement relative to the piston.

In the modified structure last described the thrust is transmitted between the piston and the connecting rod through the contacting surfaces of the shoe and rod and, therefore, the wrist pin is relieved of transverse strain and will last indefinitely.

In both forms of the device minute adjustment of the shoe relative to the connecting rod can be effected by inserting a shim between the shoe and the inner end of the recess in which it is seated. One of these shims has been illustrated at 33 in Figure 2 and at 34 in Figure 6.

What is claimed is:

1. A combination with a piston having a recess extending thereinto from one end, of a connecting rod extending into said recess, a wrist pin extending diametrically within the piston for coupling the connecting rod to the piston, a shoe seated in the inner end of the recess and having a concaved bearing surface for engagement by the end of the connecting rod, the cooperating surfaces of the connecting rod and shoe being concentric with the longitudinal axis of the wrist pin, there being pockets in the shoe and a recess in one end portion of the piston opening into the pockets, each pocket having an oil hole opening through the concaved surface of the shoe and an air vent.

2. The combination with a piston, of a connecting rod extending thereinto and pivotally connected, a shoe seated in the piston having a concave bearing surface for engagement by the end of the connecting rod thereby to constitute a thrust bearing for the rod, there being a pocket in the shoe and a recess in the head portion of the piston opening into the pocket, and means for conducting a lubricant through the wall of the piston head and into the recess and to the pocket, said pocket having an oil hole for directing lubricant to the contacting faces of the shoe and connecting rod and an air vent in the wall of the pocket.

3. The combination with a piston having a recess extending thereinto from one end, of a connecting rod pivotally mounted in the recess, a shoe seated in the recess and constituting a thrust bearing for the connecting rod, said shoe having a pocket provided with a lubricant outlet and an air vent, said outlet constituting means for directing a lubricant onto the cooperating faces of the connecting rod and the shoe and said air vent opening into the recess containing the connecting rod, and means for directing a lubricant through the wall of the piston into the pocket.

In testimony that I claim the foregoing as my own, I have hereto affixed my signature.

MICHAEL H. ACKERMAN.